2,778,842

4,21-DIHALO-17α-HYDROXYPREGNANE-3,11,20-TRIONE

Gunther S. Fonken, Kalamazoo, Robert H. Levin, Kalamazoo Township, Kalamazoo County, and A Vern McIntosh, Jr., Kalamazoo, Mich., assignors to The Upjohn Company, Kalamazoo, Mich., a corporation of Michigan No Drawing. Application July 14, 1953,
Serial No. 367,984

4 Claims. (Cl. 260—397.45)

The present invention relates to steroid compounds and is more particularly concerned with the novel 4,21-dihalo-17α-hydroxypregnane-3,11,20-triones which may be represented by the formula:

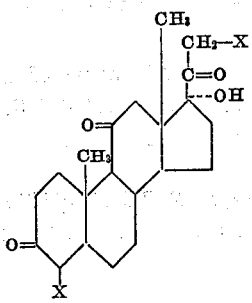

wherein X is selected from the group consisting of chlorine and bromine, the provision of these compounds being the main object of this invention. These compounds can be prepared by halogenation of the appropriate 3,11,17,20-tetra-oxygenated steroids.

The 4,21-dihalo compounds of the present invention are particularly useful since they can be converted to cortisone 21-acylates wherein the 21-acylate is very sensitive to chemical reagents. This is possible because the products of the present invention can be converted to cortisone 21-acylates by a process in which the 21-acylate is introduced as the last step, as shown in Example 1. Cortisone 21-acrylate, for example, can be conveniently prepared by the process of the present invention, but cannot be readily prepared by prior art procedures for the preparation of cortisone 21-acylates from halo-steroids which require, after introduction of the 21-acylate, the formation of a 4-double bond by halogenation and subsequent dehydrohalogenation, since the 21-acrylate would react during these subsequent steps, e. g., the 21-acrylate would add halogen. Other objects and uses of the present invention will be apparent to one skilled in the art to which this invention pertains.

The following examples are illustrative of the products of the present invention but are not to be construed as limiting.

Example 1.—4,21-dibromo-17α-hydroxypregnane-3,11,20-trione

Ten grams (10 grams) of 17α-hydroxy-21-bromopregnane-3,11,20-trione, melting point 213 to 215 degrees centigrade (decomposition), dissolved in a mixture of 250 milliliters of acetic acid and 150 milliliters of methylene dichloride, is brominated at room temperature using a solution of 3.96 grams of bromine in 54 milliliters of acetic acid. The bromine is added dropwise, with continuous stirring, allowing sufficient time for each drop to be decolorized before adding subsequent drops. After the total amount of bromine has been added, the mixture is poured into one and one-half liters of water and the methylene dichloride layer is separated. The water layer is extracted with three 100-milliliter portions of methylene dichloride and the combined methylene dichloride solutions are concentrated. The thus-produced 4,21-dibromo-17α-hydroxypregnane-3,11,20-trione, after two recrystallizations from a mixture of ethyl acetate and normal-hexane (Skellysolve B) has a melting point of 165 to 170 degrees centigrade. The total yield based on the starting 17α-hydroxy-21-bromopregnane-3,11,20-trione is 63 percent of the theoretical amount.

The 4,21-dibromo-17α-hydroxypregnane-3,11,20-trione can be converted to 21-bromo-17α-hydroxy-4-pregnene-3,11,20-trione as follows:

A solution of 4.40 grams of 4,21-dibromo-17α-hydroxypregnane-3,11,20-trione and 1.32 grams of semicarbazide hydrochloride in 42 milliliters of dioxane and 8.5 milliliters of water is stirred for a period of one hour at room temperature (about 26 degrees centigrade). Four milliliters of pyruvic acid and five milliliters of water are added, and the solution is heated for one hour at sixty degrees centigrade. The resulting mixture is poured into one liter of water and extracted with methylene dichloride. After washing with water, dilute aqueous sodium hydroxide solution, and again with water, the solution is dried over anhydrous sodium sulfate and, after removal of the drying agent, the solvent distilled. The residue remaining is recrystallized from 150 milliliters of acetone to give 21-bromo-17α-hydroxy-4-pregnene-3,11,20-trione of melting point 225 to 245 degrees centigrade (decomposition).

The 21-bromo-17α-hydroxy-4-pregnene-3,11,20-trione can be converted to cortisone acetate (17α-hydroxy-21-acetoxy-4-pregnene-3,11,20-trione) as follows:

One gram of 17α-hydroxy-21-bromo-4-pregnene-3,11,-20-trione, dissolved in 200 milliliters of acetone, is heated under reflux for a period of seventeen hours with 1.2 grams of anhydrous potassium acetate, a few small crystals of potassium iodide, and one milliliter of glacial acetic acid. The reaction mixture is then cooled, and the inorganic salts removed by filtration. Evaporation of the solvent from the filtrate gives white needles of 17α-hydroxy-21-acetoxy-4-pregnene-3,11,20-trione (cortisone acetate) of melting point 210 to 220 degrees centigrade. Recrystallization from acetone gives pure cortisone acetate of melting point 234 to 237 degrees centigrade.

Example 2.—4-chloro-17α-hydroxy-21-bromopregnane-3,11,20-trione

A solution of two grams of 3α,17α-dihydroxy-21-bromopregnane-11,20-dione, melting point 178 to 180 degrees centigrade, in fifty milliliters of tertiary-butyl alcohol containing 1.5 milliliters of water and 0.38 milliliter of concentrated hydrochloric acid is reacted with 1.12 milliliters of tertiary-butyl hypochlorite for 3.5 hours, at the end of which time the hypochlorite is completely consumed. The solution is then diluted with twice its volume of water whereupon the theoretical 2.17 grams of 4-chloro-17α-hydroxy-21-bromopregnane-3,11,20-trione precipitates, melting point 168 to 174 degrees centigrade.

Analysis.—Calculated for $C_{21}H_{28}ClBrO_4$: Total halogen, 25.10. Found: Total halogen, 24.42.

4-chloro-17α-hydroxy-21-bromopregnane-3,11,20-trione also is obtained in exactly the same manner as above using the same reactants but substituting tertiary-amyl hypochlorite for the tertiary-butyl hypochlorite. 4-chloro-17α-hydroxy-21-bromopregnane-3,11,20-trione is a stable compound and does not decompose on standing. The presence of a halogen atom at carbon atom 4 and at carbon atom 21 renders the compound a valuable precursor to known physiologically active cortical hormones. Dehydrohalogenation with semicarbazide hydrochloride followed by pyruvic acid gives 17α-hydroxy-21-bromo-4-pregnene-3,11,20-trione. Subsequent treatment with potassium acetate in acetone gives cortisone acetate.

*Example 3.—4,21-dichloro-17α-hydroxypregnane-3,11,-20-trione*

Treatment of 3α,17α-dihydroxypregnane-11,20-dione [Sarett, J. Am. Chem. Soc., 70, 1454 (1948)] with chlorine in acetic acid is productive of 3α,17α-dihydroxy-21-chloropregnane-11,20-dione. In the same manner as described in Example 2, reacting 3α,17α-dihydroxy-21-chloropregnane-11,20-dione with tertiary-butyl hypochlorite in tertiary-butyl alcohol in the presence of water and hydrochloric acid is productive of 4,21-dichloro-17α-hydroxypregnane-3,11,20-trione in high yield. 4,21-dichloro-17α-hydroxypregnane-3,11,20-trione is a stable, well-defined crystalline solid which does not decompose on standing. Dehydrohalogenation followed by treatment with potassium acetate gives cortisone acetate as in Example 2.

*Example 4.—4-chloro-21-bromo-17α-hydroxypregnane-3,11,20-trione*

Following the method of Example 2, 21-bromo-3α,11α,-17α-trihydroxypregnane-20-one, melting point 123 to 125 degrees centigrade, gives 4-chloro-21-bromo-11α,17α-dihydroxy-pregnane-3,20-dione in excellent yield. Mild oxidation of the 11α-hydroxy group of 4-chloro-21-bromo-11α,17α-dihydroxypregnane-3,20-dione gives 4-chloro-21-bromo-17α-hydroxypregnane-3,11,20-trione, melting at 169 to 174 degrees centigrade, which can be converted to cortisone acetate as shown in Example 2. Chlorination of 21-bromo-17α-hydroxypregnane-3,11,20-trione with chlorine in acetic acid also is productive of 4-chloro-21-bromo-17α-hydroxypregnane-3,11,20-trione.

The 4,21-dihalo-17α-hydroxypregnane-3,11,20-triones of the present invention may also be prepared from other suitable 3,11,17,20-tetra-oxygenated steroids using appropriate halogenation procedures. It is to be understood, therefore, that the invention is not to be limited to the exact details of operation or exact compounds shown and described as obvious modifications and equivalents will be apparent to one skilled in the art and the invention is therefore to be limited only by the scope of the appended claims.

This application is a continuation-in-part of our copending applications, Serial Numbers 299,232; 299,233; and 299,234 now Patent Nos. 2,714,599; 2,714,600; and 2,714,601, respectively; each filed July 16, 1952.

We claim:
1. A 4,21-dihalo-17α-hydroxypregnane-3,11,20-trione selected from the group consisting of 4,21-dichloro-17α-hydroxypregnane - 3,11,20 - trione, 4,21 - dibromo - 17α-hydroxypregnane, 3,11,20-trione, and 4-chloro-21-bromo-17α-hydroxypregnane-3,11,20-trione.
2. 4,21-dichloro-17α-hydroxypregnane-3,11,20-trione.
3. 4,21-dibromo-17α-hydroxypregnane-3,11,20-trione.
4. 4 - chloro - 21 - bromo - 17α - hydroxypregnane-3,11,20-trione.

References Cited in the file of this patent

UNITED STATES PATENTS

| | | |
|---|---|---|
| 2,369,065 | Marker | Feb. 6, 1945 |
| 2,686,187 | Clinton | Aug. 10, 1954 |

OTHER REFERENCES

Kritchevsky et al.: JACS. Sec. 74, 483–86 (January 1952).